US009640829B2

(12) United States Patent
Ricci-Ottati et al.

(10) Patent No.: US 9,640,829 B2
(45) Date of Patent: May 2, 2017

(54) HEATER AND METHOD OF OPERATING

(71) Applicant: DELPHI TECHNOLOGIES, INC., Troy, MI (US)

(72) Inventors: Giulio A. Ricci-Ottati, Burton, MI (US); Bernhard A. Fischer, Honeoye Falls, NY (US); Thomas W. Silvis, Flushing, MI (US); Kurtis F. Weess, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 658 days.

(21) Appl. No.: 14/098,830

(22) Filed: Dec. 6, 2013

(65) Prior Publication Data

US 2015/0162637 A1 Jun. 11, 2015

(51) Int. Cl.
*E21B 36/00* (2006.01)
*H01M 8/04* (2016.01)
*H01M 8/24* (2016.01)
*H01M 8/249* (2016.01)
*H01M 8/04007* (2016.01)
*E21B 41/00* (2006.01)
*E21B 43/24* (2006.01)
(Continued)

(52) U.S. Cl.
CPC ......... *H01M 8/249* (2013.01); *E21B 41/0085* (2013.01); *E21B 43/2401* (2013.01); *H01M 8/04037* (2013.01); *H01M 8/04268* (2013.01); *H01M 8/2475* (2013.01)

(58) Field of Classification Search
CPC ............. H01M 8/249; H01M 8/04037; H01M 8/2475; H01M 8/04268; E21B 41/0085; E21B 43/2401
See application file for complete search history.

(56) References Cited

U.S. PATENT DOCUMENTS

| 6,684,948 B1 | 2/2004 | Savage |
| 6,720,099 B1 | 4/2004 | Haltiner, Jr. |

(Continued)

OTHER PUBLICATIONS

PCT/US2014/068069 International Search Report Dated May 15, 2015.

(Continued)

*Primary Examiner* — Miriam Stagg
*Assistant Examiner* — Lilia V Nedialkova
(74) *Attorney, Agent, or Firm* — Joshua M. Haines

(57) ABSTRACT

A heater includes a heater housing extending along a heater axis; a fuel cell stack assembly disposed within the heater housing and having a plurality of fuel cells which convert chemical energy from a fuel into heat and electricity through a chemical reaction with an oxidizing agent; an electric resistive heating element disposed within the heater housing and electrically connected to the fuel cell stack assembly; and a first thermal switch located between the fuel cell stack assembly and the electric resistive heating element. The first thermal switch is closed to place the fuel cell stack assembly in electrical communication with the electric resistive heating element when the fuel cell stack assembly is electrochemically active and is open to prevent electrical communication between the fuel cell stack assembly and the electric resistive heating element when the fuel cell stack assembly is not electrochemically active.

14 Claims, 5 Drawing Sheets

(51) Int. Cl.
*H01M 8/04223* (2016.01)
*H01M 8/2475* (2016.01)

(56) References Cited

U.S. PATENT DOCUMENTS

| | | |
|---|---|---|
| 7,182,132 B2 | 2/2007 | Savage |
| 2001/0049039 A1 | 12/2001 | Haltiner, Jr. |
| 2002/0011335 A1* | 1/2002 | Zhang ................ E21B 41/0085 166/335 |
| 2003/0003339 A1 | 1/2003 | Keegan |
| 2004/0200605 A1 | 10/2004 | Yoshida et al. |
| 2004/0229096 A1 | 11/2004 | Standke et al. |
| 2005/0016729 A1 | 1/2005 | Savage |
| 2005/0123814 A1* | 6/2005 | Calhoon ........... H01M 8/04037 429/432 |
| 2006/0141308 A1 | 6/2006 | Becerra et al. |
| 2006/0147771 A1 | 7/2006 | Russell et al. |
| 2007/0048685 A1 | 3/2007 | Kuenzler et al. |
| 2009/0305099 A1* | 12/2009 | Chowdhury ...... H01M 8/04037 429/413 |
| 2010/0163226 A1 | 7/2010 | Zornes |
| 2010/0300486 A1* | 12/2010 | Hoffman ................ B08B 9/027 134/8 |
| 2012/0094201 A1 | 4/2012 | Haltiner, Jr. et al. |
| 2013/0101908 A1 | 4/2013 | McAlister |

OTHER PUBLICATIONS

"Phase 1 Report, Geothermic Fuel Cell In-Situ Applications for Recovery of Unconventional Hydrocarbons"; Independent Energy Partners; Title: Geothermic Fuel Cells: Phase 1 Report.

* cited by examiner

HEATER AND METHOD OF OPERATING

TECHNICAL FIELD OF INVENTION

The present invention relates to a heater which uses fuel cell stack assemblies as a source of heat; more particularly to such a heater which is positioned within a bore hole of an oil containing geological formation in order to liberate oil therefrom; and even more particularly to such a heater which includes electric resistive heating elements as an additional source of heat in order to supplement the fuel cell stack assemblies and start operation of the fuel cell stack assemblies such that the electric resistive heating elements are powered by the fuel cell stack assemblies.

BACKGROUND OF INVENTION

Subterranean heaters have been used to heat subterranean geological formations in oil production, remediation of contaminated soils, accelerating digestion of landfills, thawing of permafrost, gasification of coal, as well as other uses. Some examples of subterranean heater arrangements include placing and operating electrical resistance heaters, microwave electrodes, gas-fired heaters or catalytic heaters in a bore hole of the formation to be heated. Other examples of subterranean heater arrangements include circulating hot gases or liquids through the formation to be heated, whereby the hot gases or liquids have been heated by a burner located on the surface of the earth. While these examples may be effective for heating the subterranean geological formation, they may be energy intensive to operate.

U.S. Pat. Nos. 6,684,948 and 7,182,132 to Savage propose subterranean heaters which use fuel cells as a more energy efficient source of heat. The fuel cells are disposed in a heater housing which is positioned within the bore hole of the formation to be heated. The fuel cells convert chemical energy from a fuel into heat and electricity through a chemical reaction with an oxidizing agent. U.S. Pat. No. 7,182,132 teaches that in order to start operation of the heater, an electric current may be passed through the fuel cells in order to elevate the temperature of the fuel cells sufficiently high to allow the fuel cells to operate, i.e. an electric current is passed through the fuel cells before the fuel cells are electrically active. While passing an electric current through the fuel cells may elevate the temperature of the fuel cells, passing an electric current through the fuel cells before the fuel cells are electrically active may be harsh on the fuel cells and may lead to a decreased operational life thereof.

The fuel cells of U.S. Pat. Nos. 6,684,948 and 7,182,132 generate electricity in addition to heat, consequently, it is desirable to utilize the electricity that is generated in order to maximize efficiency. However, providing conductors to transmit the electricity to the surface of the formation may be costly and complex to implement.

What is needed is a heater which minimizes or eliminates one of more of the shortcomings as set forth above.

SUMMARY OF THE INVENTION

The present invention provides a heater and a method which allows all electricity generated by fuel cell stack assemblies of the heater to be utilized without the need for providing conductors to transmit the electricity out of the heater. The electricity generated by the fuel cells is used to operate electric resistive heating elements within the heater which are passively disconnected from the fuel cell stack assemblies when respective fuel cell stack assemblies are not electrochemically active. Furthermore, since the electricity generated by the fuel cell stack assemblies is used to produce heat with the electric resistive heating elements, fewer fuel cell stack assemblies are needed. One or more select fuel cell stack assemblies may be elevated to operational temperature by a startup electric resistive heating element supplied by electricity from an external source while the remaining fuel cell stack assemblies are automatically elevated to operational temperature without energy or fuel from an external source.

A heater in accordance with the present invention includes a heater housing extending along a heater axis; a fuel cell stack assembly disposed within the heater housing and having a plurality of fuel cells which convert chemical energy from a fuel into heat and electricity through a chemical reaction with an oxidizing agent; an electric resistive heating element disposed within the heater housing and electrically connected to the fuel cell stack assembly; and a first thermal switch located between the fuel cell stack assembly and the electric resistive heating element. The first thermal switch is closed to place the fuel cell stack assembly in electrical communication with the electric resistive heating element when the fuel cell stack assembly is electrochemically active at or above an active temperature and the first thermal switch is open to prevent electrical communication between the fuel cell stack assembly and the electric resistive heating element when the fuel cell stack assembly is not electrochemically active at an inactive temperature which is below the active temperature.

A method is also provided for operating a heater having a heater housing extending along a heater axis; a fuel cell stack assembly disposed within the heater housing and having a plurality of fuel cells which convert chemical energy from a fuel into heat and electricity through a chemical reaction with an oxidizing agent; an electric resistive heating element disposed within the heater housing and electrically connected to the fuel cell stack assembly; and a first thermal switch located between the fuel cell stack assembly and the electric resistive heating element. The method includes closing the first thermal switch to place the fuel cell stack assembly in electrical communication with the electric resistive heating element when the fuel cell stack assembly is electrochemically active at or above an active temperature. The method also includes opening the first thermal switch to prevent electrical communication between the fuel cell stack assembly and the electric resistive heating element when the fuel cell stack assembly is not electrochemically active at an inactive temperature which is below the active temperature.

The heater and method allows all electricity generated by the fuel cell stack assemblies to be utilized without the need for providing conductors to transmit the electricity out of the heater. Furthermore, since the electricity generated by the fuel cell stack assemblies is used to produce heat with the electric resistive heating elements, fewer fuel cell stack assemblies are needed.

BRIEF DESCRIPTION OF DRAWINGS

This invention will be further described with reference to the accompanying drawings in which.

DETAILED DESCRIPTION OF INVENTION

Figure 1:
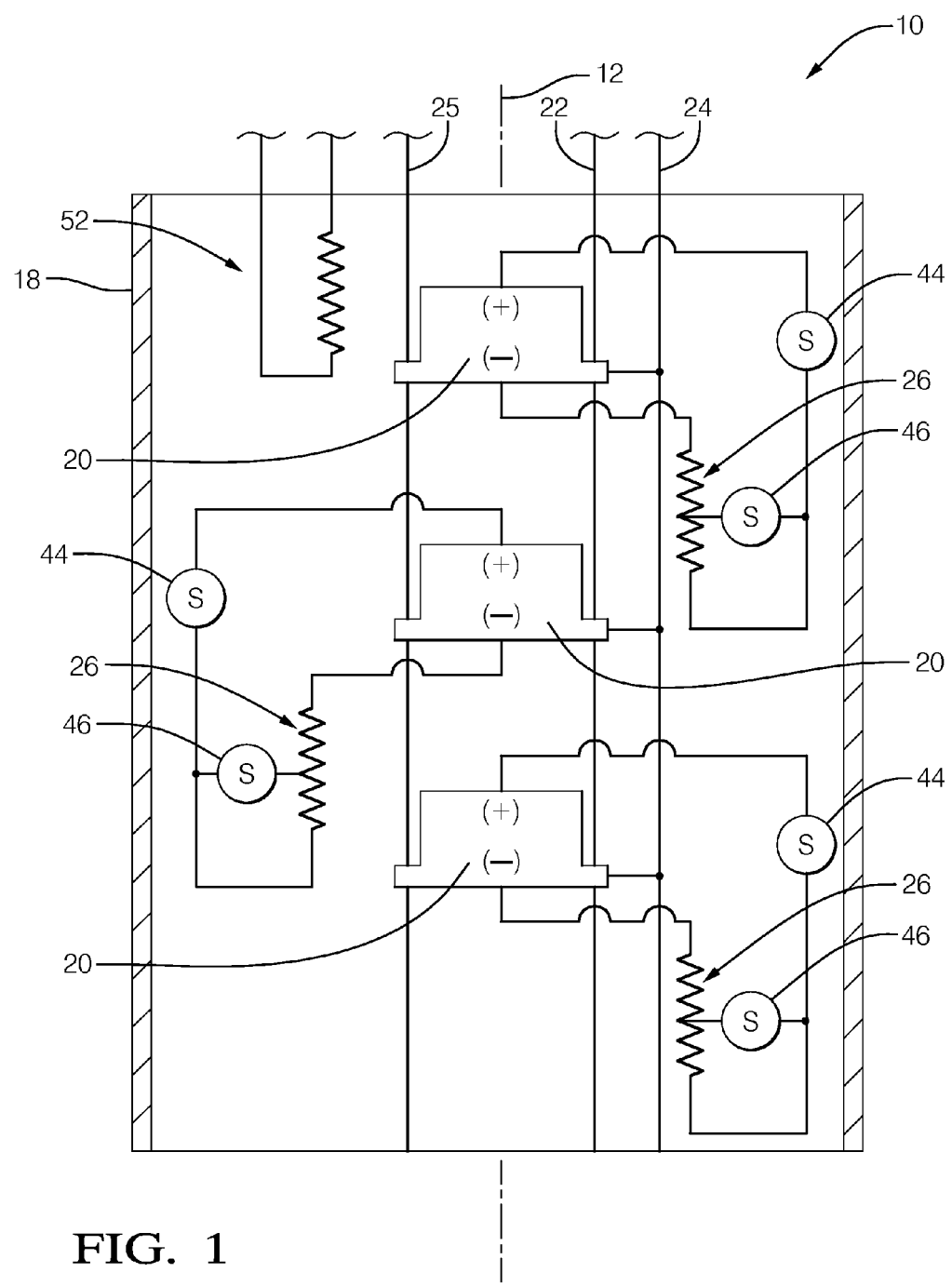
FIG. 1 is a cross-section schematic view of a heater in accordance with the present invention.
Figure 2:
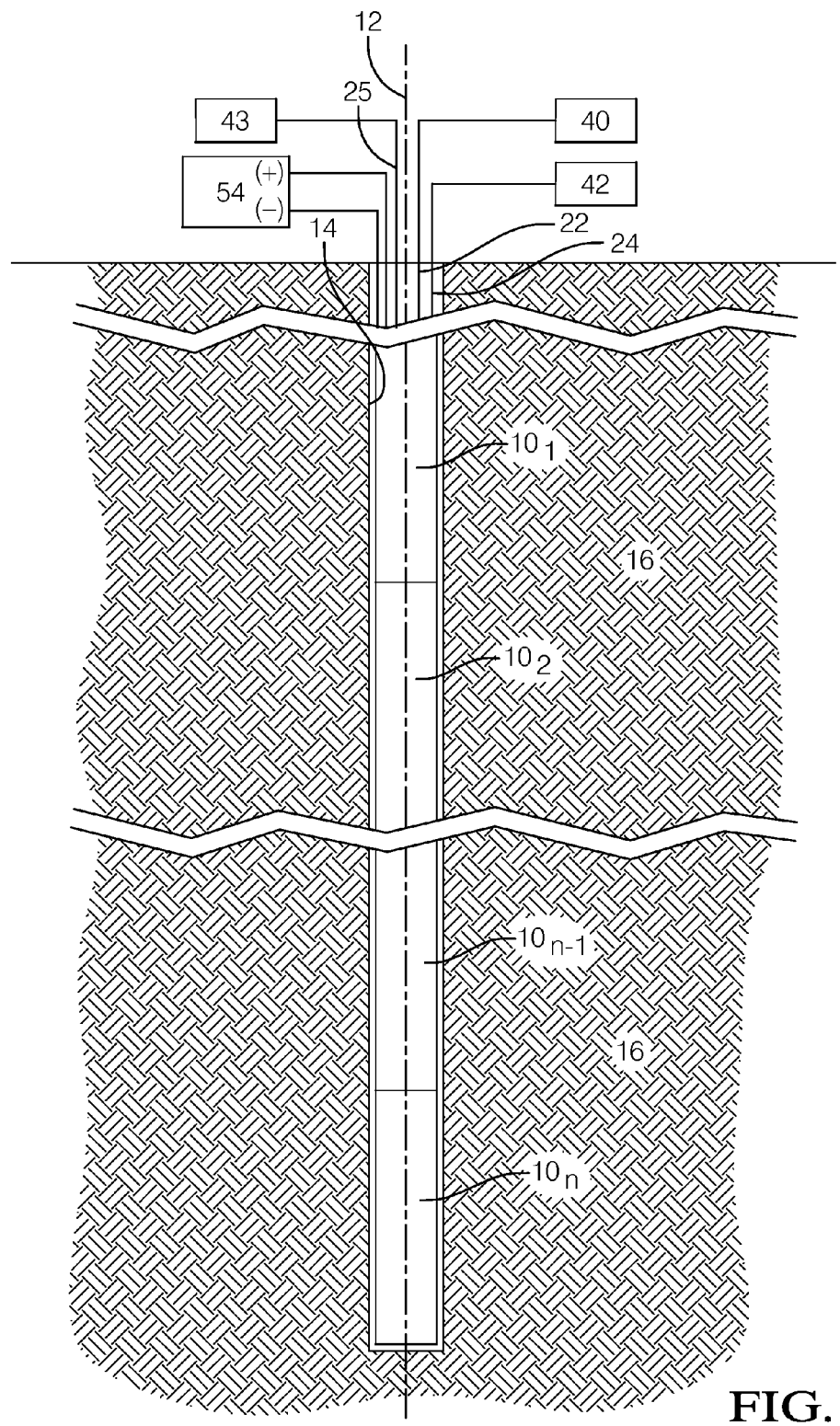
FIG. 2 is schematic view of a plurality of heaters of FIG. 1 shown in a bore hole of a geological formation.

Referring now to FIGS. 1 and 2, a heater 10 extending along a heater axis 12 is shown in accordance with the present invention. A plurality of heaters $10_1$, $10_2$, ... $10_{n-1}$, $10_n$, where n is the total number of heaters 10, may be connected together end to end within a bore hole 14 of a formation 16, for example, an oil containing geological formation, as shown in FIG. 2. Bore hole 14 may be only a few feet deep; however, may typically be several hundred feet deep to in excess of one thousand feet deep. Consequently, the number of heaters 10 needed may range from one to several hundred. It should be noted that the oil containing geological formation may begin as deep as one thousand feet below the surface and consequently, heater $10_1$ may be located sufficiently deep within bore hole 14 to be positioned near the beginning of the oil containing geological formation. When this is the case, units without active heating components may be positioned from the surface to heater $10_1$ in order to provide plumbing, power leads, and instrumentation leads to support and supply fuel and air to heaters $10_1$ to $10_n$.

Heater 10 generally includes a heater housing 18 extending along heater axis 12, a plurality of fuel cell stack assemblies 20 located within heater housing 18 for generating heat and electricity such that each fuel cell stack assembly 20 is spaced axially apart from each other fuel cell stack assembly 20, a fuel supply conduit 22 for supplying fuel to fuel cell stack assemblies 20, an oxidizing agent supply conduit 24; hereinafter referred to as air supply conduit 24; for supplying an oxidizing agent, for example air, to fuel cell stack assemblies 20, an anode exhaust conduit 25 for discharging anode exhaust from fuel cell stack assemblies 20, and a plurality of electric resistive heating elements 26 for using electricity generated by fuel cell stack assemblies 20 to generate heat. While heater 10 is illustrated with three fuel cell stack assemblies 20 within heater housing 18, it should be understood that a lesser number or a greater number of fuel cell stack assemblies 20 may be included. The number of fuel cell stack assemblies 20 within heater housing 18 may be determined, for example only, by one or more of the following considerations: the length of heater housing 18, the heat output capacity of each fuel cell stack assembly 20, the desired density of fuel cell stack assemblies 20 (i.e. the number of fuel cell stack assemblies 20 per unit of length), and the desired heat output of heater 10. While heater 10 is illustrated with three electric resistive heating elements 26, it should be understood that a lesser number or a greater number of electric resistive heating elements 26 may be included and the number of electric resistive heating elements 26 may be the same or different than the number of fuel cell stack assemblies 20. The number of heaters 10 within bore hole 14 may be determined, for example only, by one or more of the following considerations: the depth of formation 16 which is desired to be heated, the location of oil within formation 16, and the length of each heater 10.

Heater housing 18 may be substantially cylindrical and hollow and may support fuel cell stack assemblies 20 within heater housing 18. Heater housing 18 of heater $10_x$, where x is from 1 to n where n is the number of heaters 10 within bore hole 14, may support heaters $10_{x+1}$ to $10_n$ by heaters $10_{x+1}$ to $10_n$ hanging from heater $10_x$. Consequently, heater housing 18 may be made of a material that is substantially strong to accommodate the weight of fuel cell stack assemblies 20 and heaters $10_{x+1}$ to $10_n$. The material of heater housing 18 may also have properties to withstand the elevated temperatures, for example 600° C. to 900° C., as a result of the operation of fuel cell stack assemblies 20. For example only, heater housing 18 may be made of a 300 series stainless steel with a wall thickness of 3/16 of an inch.

Figure 3:
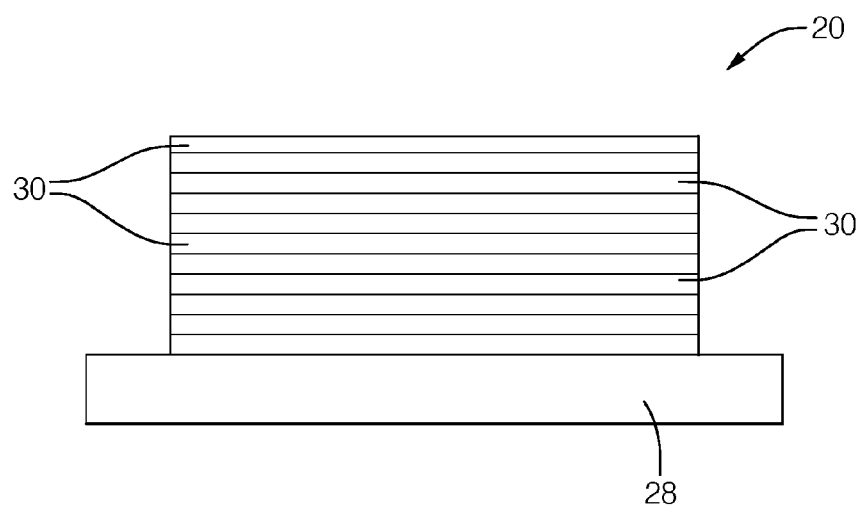
FIG. 3 is an elevation schematic view of a fuel stack assembly of the heater of FIG. 1.
Figure 4:
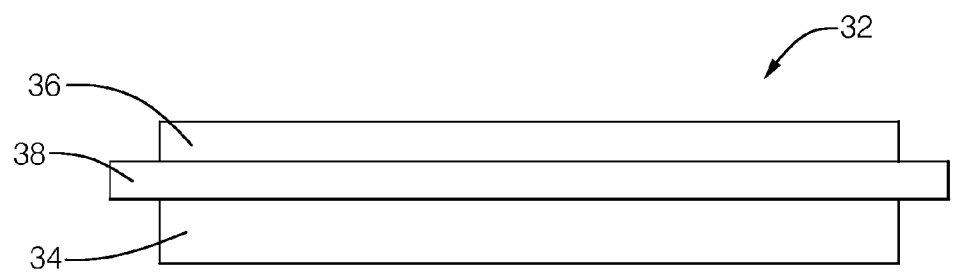
FIG. 4 is an elevation schematic view of a fuel cell of the fuel cell stack assembly of FIG. 3.

With continued reference to FIGS. 1 and 2 and now with additional reference to FIGS. 3 and 4, fuel cell stack assemblies 20 may be, for example only, solid oxide fuel cells which generally include a fuel cell manifold 28 and a plurality of fuel cell cassettes 30 (for clarity, only select fuel cell cassettes 30 have been labeled). Each fuel cell stack assembly 20 may include, for example only, 20 to 50 fuel cell cassettes 30.

Each fuel cell cassette 30 includes a fuel cell 32 having an anode 34 and a cathode 36 separated by a ceramic electrolyte 38. Each fuel cell 32 converts chemical energy from a fuel supplied to anode 34 into heat and electricity through a chemical reaction with air supplied to cathode 36. Fuel cell cassettes 30 have no electrochemical activity below a first temperature, for example, about 500° C., and consequently will not produce heat and electricity below the first temperature. Fuel cell cassettes 30 have a very limited electrochemical activity between the first temperature and a second temperature; for example, between about 500° C. and about 700° C., and consequently produces limited heat and electricity between the first temperature and the second temperature, for example only, about 0.01 kW to about 3.0 kW of heat (due to the fuel self-igniting above about 600° C.) and about 0.01 kW to about 0.5 kW electricity for a fuel cell stack assembly having thirty fuel cell cassettes 30. When fuel cell cassettes 30 are elevated above the second temperature, for example, about 700° C. which is considered to be the active temperature, fuel cell cassettes 30 are considered to be active and produce desired amounts of heat and electricity, for example only, about 0.5 kW to about 3.0 kW of heat and about 1.0 kW to about 1.5 kW electricity for a fuel cell stack assembly having thirty fuel cell cassettes 30. Further features of fuel cell cassettes 30 and fuel cells 32 are disclosed in United States Patent Application Publication No. US 2012/0094201 to Haltiner, Jr. et al. which is incorporated herein by reference in its entirety.

Fuel cell manifold 28 receives fuel, e.g. a hydrogen rich reformate, which may be supplied from a fuel reformer 40, through fuel supply conduit 22 and distributes the fuel to each fuel cell cassette 30. Fuel cell manifold 28 also receives an oxidizing agent, for example, air from an air supply 42, through air supply conduit 24 and distributes the air to each fuel cell cassette 30. Fuel cell manifold 28 also receives anode exhaust, i.e. spent fuel and excess fuel from fuel cells 32 which may comprise $H_2$, $CO$, $H_2O$, $CO_2$, and $N_2$, and cathode exhaust, i.e. spent air and excess air from fuel cells 32 which may comprise $O_2$ (depleted compared to the air supplied through air supply conduit 24) and $N_2$. Anode exhaust from fuel cell stack assemblies 20 is sent to anode exhaust return conduit 25 while cathode exhaust from fuel cell stack assemblies 20 is discharged into heater housing 18. Anode exhaust return conduit 25 communicates the anode exhaust out of heaters 10, e.g. out of bore hole 14, where the anode exhaust may be utilized by an anode exhaust utilization device 43 which may be used, for example only, to produce steam, drive compressors, or supply a fuel reformer. In order to estimate the thermal output of fuel cell stack assemblies 20, the anode exhaust communicated through anode exhaust return conduit 25 may be analyzed. Furthermore, the thermal output of fuel cell stack assemblies 20 may be adjusted by modulating the cathode flow or by adjusting the composition of the reformate. For example, methane may be added to the reformate which causes internal reforming within fuel cell stack assemblies 20. The internal reforming uses heat, thereby decreasing the thermal output of fuel cell stack assemblies 20.

Figure 5:
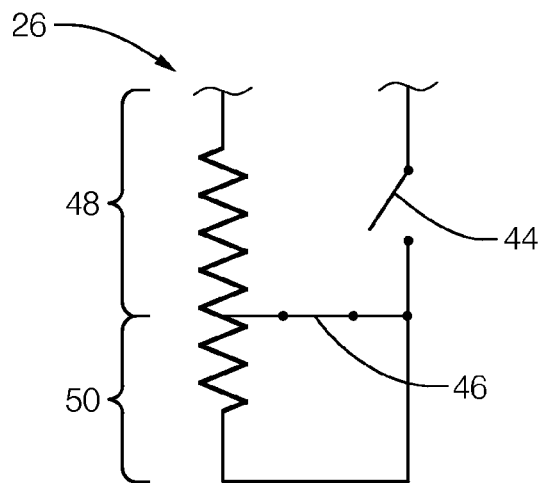
FIGS. 5-7 show three operational states of a resistive heating element of the heater of FIG. 1.
Figure 6:
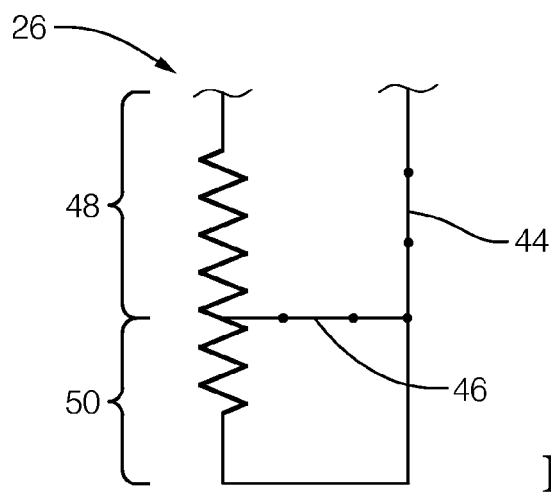
Figure 7:
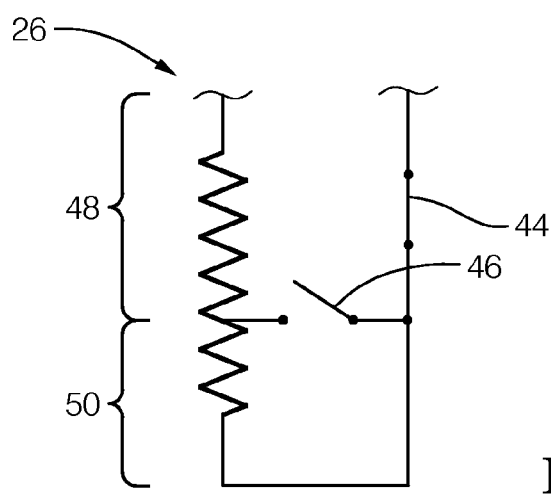

With continued reference to FIGS. 1 and 2 and now with additional reference to FIGS. 5-7, each electric resistive heating element 26 is electrically connected to a respective fuel cell stack assembly 20. A first switch illustrated as a first thermal switch 44 is located between each electric resistive heating element 26 and its respective fuel cell stack assembly 20 while a second switch illustrated as a second thermal switch 46 divides each electric resistive heating element 26 into a first heater zone 48 and a second heater zone 50. First thermal switch 44 and second thermal switch 46 will be discussed in greater detail in the paragraphs that follow.

First thermal switch 44 is arranged to be open at temperatures indicative of its respective fuel cell stack assembly 20 not being electrochemically active, thereby preventing electrical communication between fuel cell stack assembly 20 and electric resistive heating element 26. This operational state of electric resistive heating element 26 is shown in FIG. 5. First thermal switch 44 is also arranged to be closed at temperatures indicative of its respective fuel cell stack assembly 20 being electrochemically active, thereby providing electrical communication between fuel cell stack assembly 20 and electric resistive heating element 26. This operational state of electric resistive heating element 26 is shown in FIGS. 6 and 7. As described previously, the active temperature may be about 700° C., consequently, first thermal switch 44 is arranged to be open below about 700° C. and closed at or above about 700° C. In this way, electric resistive heating element 26 does not draw an electric current from fuel cell stack assembly 20 below the active temperature because drawing an electric current from fuel cell stack assembly 20 below the active temperature may lead to decreased operational life of fuel cell stack assembly 20.

Second thermal switch 46 is arranged to be closed below a predetermined temperature as shown in FIGS. 5 and 6 and to be open at or above the predetermined temperature as shown in FIG. 7. When second thermal switch 46 is closed as shown in FIG. 6, electricity from fuel cell stack assembly 20 is able to flow only through first heater zone 48 since second thermal switch 46 provides a low resistance path to bypass second heater zone 50, thereby preventing electricity from flowing through second heater zone 50 which is higher in resistance compared to second thermal switch 46. Conversely, when second thermal switch 46 is open as shown in FIG. 7, electricity from fuel cell stack assembly 20 is able to flow through both first heater zone 48 and second heater zone 50 since second thermal switch 46 no longer provides a low resistance path to bypass second heater zone 50. The resistance through only first heater zone 48 is less than the resistance through both first heater zone 48 and second heater zone 50. Consequently, an electric current of greater magnitude flows through electric resistive heating element 26 when second thermal switch 46 is closed while an electric current of a lesser magnitude flows through electric resistive heating element 26 when second thermal switch 46 is open. As a result, electric resistive heating element 26 yields a greater thermal output when second thermal switch 46 is closed compared to when second thermal switch 46 is open.

The predetermined temperature, i.e. the temperature at which second thermal switch 46 is arranged to be closed below and to be open at or above, is higher than the active temperature of fuel cell stack assembly 20, which as described previously, may be about 700° C. For example, the predetermined temperature may be about 850° C. In this way, the thermal output of electric resistive heating element 26 is lowered when the temperature within heater housing 18 is sufficiently high as a result of operation of fuel cell stack assemblies 20. Conversely, if a fuel cell stack assembly 20 fails, second thermal switch 46 of one or more adjacent electric resistive heating elements 26 may close due to a decrease in temperature resulting from the failed fuel cell stack assembly 20. In this way, the thermal output of one or more electric resistive heating elements 26 is increased to compensate for the failed fuel cell stack assembly 20.

Again with reference to FIGS. 1 and 2, all or some of heaters $10_1, 10_2, \ldots 10_{n-1}, 10_n$ may include a startup heater illustrated as startup electric resistive heating element 52 which is supplied with electricity by an electricity source 54 which is external to heater housing 18. While the startup heater has been illustrated as startup electric resistive heating element 52, it should be understood that other heater arrangements may be used, for example only, a combustor which combusts a mixture of fuel and air. Electricity source 54 may be located on the surface of formation 16 and may be, for example only, a utility grid, a power plant, or a generator. Startup electric resistive heating element 52 may be positioned in close proximity to the upper-most fuel cell stack assembly 20 in heater 10 in order to elevate the temperature of the upper-most fuel cell stack assembly 20 from the inactive temperature to the active temperature. After the upper-most fuel cell stack assembly 20 has reached the active temperature and produces electricity, the electric resistive heating element 26 of the upper-most fuel cell stack assembly 20 is used to elevate the temperature of the next fuel cell stack assembly 20 in heater housing 18 from the inactive temperature to the active temperature. This process will continue in a chain reaction until all fuel cell stack assemblies 20 have been elevated from the inactive temperature to the active temperature. Now looking at an example, let x be from 1 to n where n is the total number of heaters 10, heater $10_x$ includes startup electric resistive heating element 52, and heater $10_{x+1}$ does not include startup electric resistive heating element 52. The upper-most fuel cell stack assembly 20 of heater $10_{x+1}$ is elevated in temperature from the inactive temperature to the active temperature by electric resistive heating element 26 of the lower-most fuel cell stack assembly 20 of heater $10_x$. In this way, fewer heaters 10 with startup electric resistive heating element 52 are needed, thereby decreasing the electrical conductors that are needed to supply startup electric resistive heating elements 52 and decreasing the electrical output of electricity source 54. However, fewer heaters 10 with startup electric resistive heating element 52 increases the time it takes to elevate all fuel cells stack assemblies 20 from the inactive temperature to the active temperature. Consequently, the number of heaters 10 having startup electric resistive heating element 52 is determined by the desire to have faster operation of heaters 10 or fewer conductors for supplying electricity to startup electric resistive heating element 52 and lower electrical output of electricity source 54.

In operation, after heaters 10 are installed within bore hole 14, fuel cell stack assemblies 20 must be elevated to the active temperature of fuel cell stack assemblies 20 before fuel cell stack assemblies 20 may be used to generate heat and electricity. In order to elevate fuel cell stack assemblies 20 to the active temperature, electricity source 54 may supply electricity to startup electric resistive heating element 52 of the heater(s) 10 which include startup electric resistive heating element 52. Startup electric resistive heating element 52 elevates the upper-most fuel cell stack assembly 20 of heater 10 to the active temperature. When the upper-most fuel cell stack assembly 20 has reached the active temperature, the upper-most fuel cell stack assembly 20 generates electricity which is communicated to its respective electric resistive heating element 26 since first thermal switch 44 closes when upper-most fuel cell stack assembly 20 has reached the active temperature. Electric resistive heating element 26 of the upper-most fuel cell stack assembly 20 produces heat to elevate the next lower fuel cell stack assembly 20 to the active temperature. This process will continue in a chain reaction until all fuel cell stack assemblies 20 within heater 10 and subsequent heaters 10 not having startup electric resistive heating element 52 have been elevated to the operating temperature.

As mentioned previously, second thermal switch 46 remains closed until the predetermined temperature has been reached, then second thermal switch 46 opens to reduce the thermal output of electric resistive heating element 26. Second thermal switch 46 typically opens when the fuel cell stack assembly 20 which a given electric resistive heating element 26 is warming up is providing sufficient thermal output. However, if this fuel cell stack assembly 20 fails for any reason, second thermal switch 46 closes again to increase the thermal output of electric resistive heating element 26 in order to compensate for the lack of thermal output of the failed fuel cell stack assembly 20.

Figure 8:
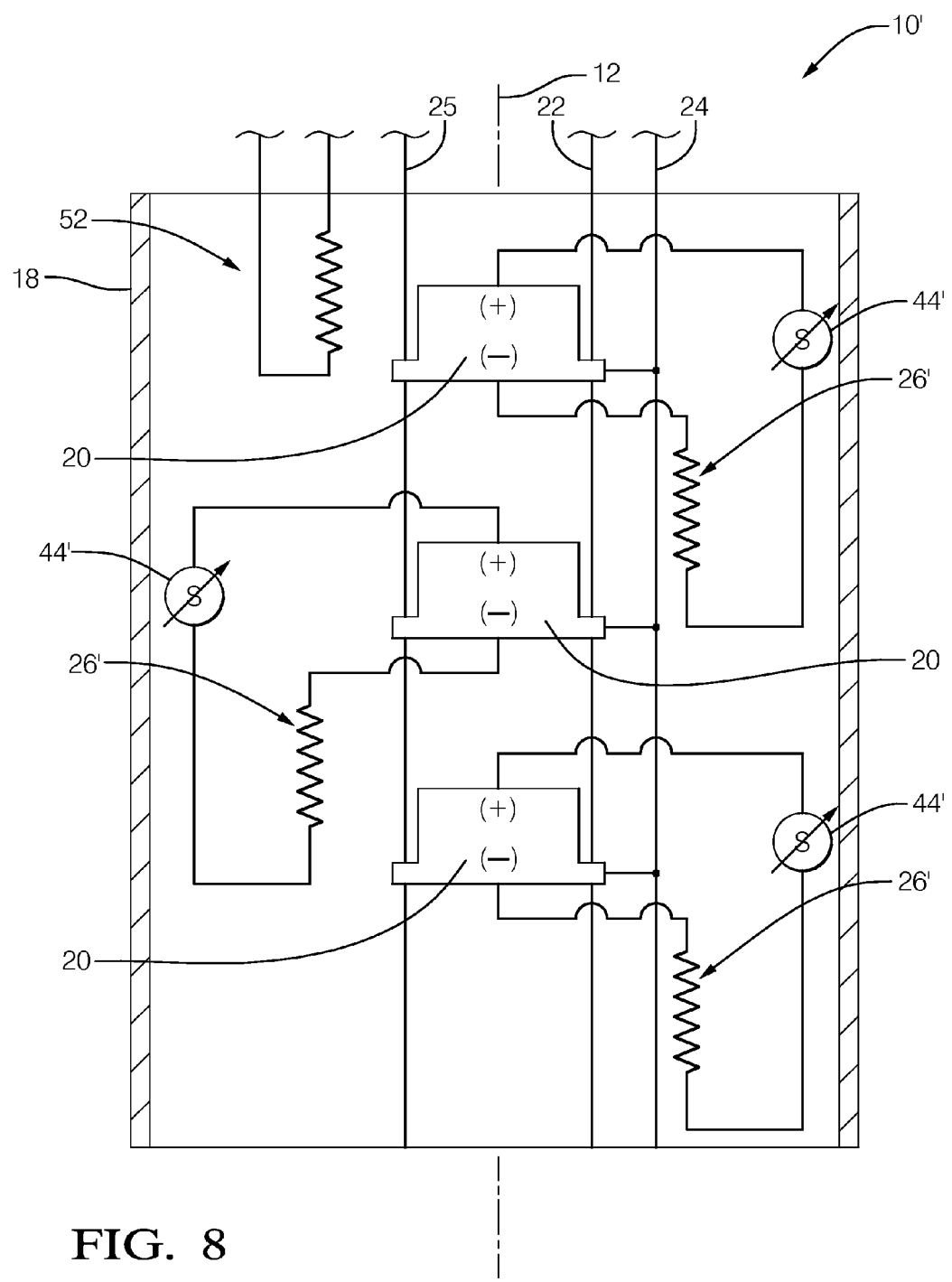
FIG. 8 is an alternative heater in accordance with the present invention.

Now referring to FIG. 8, an alternative heater 10' is shown. Heater 10' is substantially the same as heater 10 except that electric resistive heating elements 26 have been replace with electric resistive heating elements 26'. Electric resistive heating elements 26' differ from electric resistive heating elements 26 of heater 10 in that first thermal switch 44 has been replaced with thermal switch 44' and second thermal switch 46 has been eliminated. Just like first thermal switch 44 of heater 10, thermal switch 44' is arranged to be open at temperatures indicative of its respective fuel cell stack assembly 20 not being electrochemically active and to be closed at temperatures indicative of its respective fuel cell stack assembly 20 being electrochemically active. However, thermal switch 44' is also arranged to be variable in resistance. More specifically, as the temperature increases within heater housing 18, the resistance of thermal switch 44' increases, thereby decreasing the magnitude of electric current that passes through electric resistive heating elements 26' and decreasing the thermal output of electric resistive heating elements 26'. While thermal switch 44' has been described as performing both a switching function and a variable resistance function, it should now be understood that thermal switch 44' may perform only one of the switching function and the variable resistance function while a separate device may perform the other of the switching function and the variable resistance function.

Heaters 10, 10' allow all electricity generated by fuel cell stack assemblies 20 to be utilized without the need for providing conductors to transmit the electricity out of bore hole 14, thereby reducing cost and complexity. Furthermore, since the electricity generated by fuel cell stack assemblies 20 is used to produce heat with electric resistive heating elements 26, 26', fewer fuel cell stack assemblies 20 are needed, thereby further reducing cost and complexity.

While this invention has been described in terms of preferred embodiments thereof, it is not intended to be so limited, but rather only to the extent set forth in the claims that follow.

We claim:

1. A heater comprising:
a heater housing extending along a heater axis;
a fuel cell stack assembly disposed within said heater housing and having a plurality of fuel cells which convert chemical energy from a fuel into heat and electricity through a chemical reaction with an oxidizing agent;
an electric resistive heating element disposed within said heater housing and electrically connected to said fuel cell stack assembly;
a first thermal switch located between said fuel cell stack assembly and said electric resistive heating element, wherein said first thermal switch is closed to place said fuel cell stack assembly in electrical communication with said electric resistive heating element when said fuel cell stack assembly is electrochemically active at or above an active temperature and said first thermal switch is opened to prevent electrical communication between said fuel cell stack assembly and said electric resistive heating element when said fuel cell stack assembly is not electrochemically active at an inactive temperature which is below said active temperature; and
a second thermal switch which divides said electric resistive heating element into a first heater zone and a second heater zone, wherein only said first heater zone produces heat when said first thermal switch and said second thermal switch are both closed, and wherein said first heater zone and said second heater zone produce heat when said first thermal switch is closed and second thermal switch is open.

2. A heater as in claim 1 wherein said second thermal switch is arranged to be closed below a predetermined temperature and wherein said second thermal switch is arranged to be open at or above said predetermined temperature.

3. A heater as in claim 2 wherein said predetermined temperature is above said active temperature of said fuel cell stack assembly.

4. A heater comprising:
a heater housing extending along a heater axis;
a first fuel cell stack assembly disposed within said heater housing and having a plurality of fuel cells which convert chemical energy from a fuel into heat and electricity through a chemical reaction with an oxidizing agent;
a first electric resistive heating element disposed within said heater housing and electrically connected to said first fuel cell stack assembly;
a first thermal switch located between said first fuel cell stack assembly and said first electric resistive heating element, wherein said first thermal switch is closed to place said first fuel cell stack assembly in electrical communication with said first electric resistive heating element when said first fuel cell stack assembly is electrochemically active at or above an active temperature and said first thermal switch is opened to prevent electrical communication between said first fuel cell stack assembly and said first electric resistive heating element when said first fuel cell stack assembly is not electrochemically active at an inactive temperature which is below said active temperature; and a second fuel cell stack assembly disposed within said heater housing and spaced axially apart from said first fuel cell stack assembly, said second fuel cell stack assembly being arranged to be elevated in temperature from said inactive temperature to said active temperature by said first electric resistive heating element.

5. A heater as in claim 4 further comprising a second electric resistive heating element disposed within said heater housing and electrically connected to said second fuel cell stack assembly.

6. A heater comprising:
a heater housing extending along a heater axis;
a fuel cell stack assembly disposed within said heater housing and having a plurality of fuel cells which convert chemical energy from a fuel into heat and electricity through a chemical reaction with an oxidizing agent;
an electric resistive heating element disposed within said heater housing and electrically connected to said fuel cell stack assembly;
a first thermal switch located between said fuel cell stack assembly and said electric resistive heating element, wherein said first thermal switch is closed to place said fuel cell stack assembly in electrical communication with said electric resistive heating element when said fuel cell stack assembly is electrochemically active at or above an active temperature and said first thermal switch is opened to prevent electrical communication between said fuel cell stack assembly and said electric resistive heating element when said fuel cell stack assembly is not electrochemically active at an inactive temperature which is below said active temperature; and
a startup electric resistive heating element disposed within said heater housing, said startup electric resistive heating element receiving electricity from an electricity source external to said heater housing, wherein said startup electric resistive heating element is arranged to elevate the temperature of said fuel cell stack assembly from said inactive temperature to said active temperature.

7. A plurality of heaters disposed within a bore hole of a formation, each one of said plurality of heaters comprising:
a plurality of fuel cell stack assemblies disposed within said bore hole, each one of said plurality of fuel cell stack assemblies having a plurality of fuel cells which convert chemical energy from a fuel into heat and electricity through a chemical reaction with an oxidizing agent;
an electric resistive heating element disposed within said bore hole and electrically connected to one of said plurality of fuel cell stack assemblies; and
a first thermal switch located between said one of said plurality of fuel cell stack assemblies and said electric resistive heating element, wherein said first thermal switch is closed to place said one of said plurality of fuel cell stack assemblies in electrical communication with said electric resistive heating element when said one of said plurality of fuel cell stack assemblies is electrochemically active at or above an active temperature and said first thermal switch is opened to prevent electrical communication between said one of said plurality of fuel cell stack assemblies and said electric resistive heating element when said one of said plurality of fuel cell stack assemblies is not electrochemically active at an inactive temperature which is below said active temperature;
wherein said electric resistive heating element is one of a plurality of electric resistive heating elements and each one of said plurality of electric resistive heating elements is disposed within said bore hole and electrically connected to a respective one of said plurality of fuel cell stack assemblies;
wherein said first thermal switch is one of a plurality of first thermal switches such that each one of said plurality of first thermal switches is located between a respective one of said one of said plurality of fuel cell stack assemblies and a respective one of said plurality of electric resistive heating elements, wherein each one of said plurality of first thermal switches is closed to place a respective one of said plurality of fuel cell stack assemblies in electrical communication with said electric resistive heating element when said respective one of said plurality of fuel cell stack assemblies is electrochemically active at or above said active temperature and each one of said plurality of first thermal switches is opened to prevent electrical communication between said respective one of said plurality of fuel cell stack assemblies and said electric resistive heating element when said respective one of said plurality of fuel cell stack assemblies is not electrochemically active at said inactive temperature which is below said active temperature;
said plurality of heaters further comprising a plurality of second thermal switches such that each one of said plurality of second thermal switches divides a respective one of said plurality of electric resistive heating elements into a first heater zone and a second heater zone, wherein only said first heater zone produces heat when a respective one of said plurality of first thermal switches and a respective one of said plurality of second thermal switches are both closed, and wherein said first heater zone and said second heater zone produce heat when said respective one of said plurality of first thermal switches is closed and said respective one of said plurality of second thermal switches is open.

8. A plurality of heaters as in claim 7 wherein each one of said plurality of second thermal switches is arranged to be closed below a predetermined temperature and wherein each one of said plurality of second thermal switches is arranged to be open at or above said predetermined temperature.

9. A plurality of heaters as in claim 8 wherein said predetermined temperature is above said active temperature of said plurality of fuel cell stack assemblies.

10. A plurality of heaters disposed within a bore hole of a formation, each one of said plurality of heaters comprising:
a plurality of fuel cell stack assemblies disposed within said bore hole, each one of said plurality of fuel cell stack assemblies having a plurality of fuel cells which convert chemical energy from a fuel into heat and electricity through a chemical reaction with an oxidizing agent;
an electric resistive heating element disposed within said bore hole and electrically connected to one of said plurality of fuel cell stack assemblies; and
a first thermal switch located between said one of said plurality of fuel cell stack assemblies and said electric resistive heating element, wherein said first thermal switch is closed to place said one of said plurality of fuel cell stack assemblies in electrical communication with said electric resistive heating element when said one of said plurality of fuel cell stack assemblies is electrochemically active at or above an active temperature and said first thermal switch is opened to prevent electrical communication between said one of said plurality of fuel cell stack assemblies and said electric resistive heating element when said one of said plurality of fuel cell stack assemblies is not electrochemically active at an inactive temperature which is below said active temperature;

wherein at least one of said plurality of heaters further comprises a startup electric resistive heating element disposed within said bore hole, said startup electric resistive heating element receiving electricity from an electricity source external to said bore hole, wherein said startup electric resistive heating element is arranged to elevate the temperature of one of said plurality of fuel cell stack assemblies from said inactive temperature to said active temperature.

11. A method of operating a heater having a heater housing extending along a heater axis; a fuel cell stack assembly disposed within said heater housing and having a plurality of fuel cells which convert chemical energy from a fuel into heat and electricity through a chemical reaction with an oxidizing agent; an electric resistive heating element disposed within said heater housing and electrically connected to said fuel cell stack assembly; a first thermal switch located between said fuel cell stack assembly and said electric resistive heating element; a second thermal switch which divides said electric resistive heating element into a first heater zone and a second heater zone, said method comprising:

closing said first thermal switch to place said fuel cell stack assembly in electrical communication with said electric resistive heating element when said fuel cell stack assembly is electrochemically active at or above an active temperature;

opening said first thermal switch to prevent electrical communication between said fuel cell stack assembly and said electric resistive heating element when said fuel cell stack assembly is not electrochemically active at an inactive temperature which is below said active temperature;

using said second thermal switch to produce heat only with said first heater zone below a predetermined temperature; and using said second thermal switch to produce heat with said first heater zone and said second heater zone at or above said predetermined temperature.

12. A method as in claim 11 wherein said predetermined temperature is above said active temperature of said fuel cell stack assembly.

13. A method of operating a heater having a heater housing extending along a heater axis; a fuel cell stack assembly disposed within said heater housing and having a plurality of fuel cells which convert chemical energy from a fuel into heat and electricity through a chemical reaction with an oxidizing agent; an electric resistive heating element disposed within said heater housing and electrically connected to said fuel cell stack assembly; and a first thermal switch located between said fuel cell stack assembly and said electric resistive heating element; said method comprising:

closing said first thermal switch to place said fuel cell stack assembly in electrical communication with said electric resistive heating element when said fuel cell stack assembly is electrochemically active at or above an active temperature; and opening said first thermal switch to prevent electrical communication between said fuel cell stack assembly and said electric resistive heating element when said fuel cell stack assembly is not electrochemically active at an inactive temperature which is below said active temperature;

wherein said fuel cell stack assembly is a first fuel cell stack assembly and said electric resistive heating element is a first electric resistive heating element; said heater also having a second fuel cell stack assembly disposed within said heater housing and spaced axially apart from said first fuel cell stack assembly, said method further comprising:

using said first electric resistive heating element to elevate said second fuel cell stack assembly from said inactive temperature to said active temperature.

14. A method as in claim 13 wherein said heater includes a startup electric resistive heating element disposed within said heater housing, said method further comprising:

supplying electricity to said startup electric resistive heating element from an electricity source external to said heater housing; and using said startup electric resistive heating element to elevate the temperature of said first fuel cell stack assembly from said inactive temperature to said active temperature.

* * * * *